(12) United States Patent
Hsu (10) Patent No.: US 7,460,281 B2
(45) Date of Patent: *Dec. 2, 2008

(54) DOCUMENT HOLDING FIXTURE

(76) Inventor: Hsiu-O Hsu, No. 5, 417 Lane, Nan-Ta Rd, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/498,635

(22) Filed: Aug. 2, 2006

(65) Prior Publication Data

US 2006/0268368 A1   Nov. 30, 2006

Related U.S. Application Data

(63) Continuation of application No. 09/967,713, filed on Sep. 27, 2001, now Pat. No. 7,280,257.

(30) Foreign Application Priority Data

Aug. 14, 2001   (TW) .............................. 90213862 U (51) Int. Cl.
*H04N 1/04* (2006.01)

(52) U.S. Cl. ...................... 358/497; 358/474; 358/471; 399/379; 399/380

(58) Field of Classification Search ................ 358/497, 358/494, 474, 471, 400, 500, 505, 506, 487, 358/488, 473, 472; 382/312, 313, 318, 319; 250/234–236, 239, 216; 399/211, 212, 380, 399/379

See application file for complete search history.

(56) References Cited

U.S. PATENT DOCUMENTS

| 5,548,417 | A | 8/1996 | Sekimoto et al. |
| 6,208,437 | B1 | 3/2001 | Neushul |
| 6,233,064 | B1 | 5/2001 | Griffin |
| 6,433,941 | B1 | 8/2002 | Onoda |
| 6,661,539 | B1 | 12/2003 | Nee |
| 6,882,822 | B2 * | 4/2005 | Gomi et al. ................. 399/380 |

FOREIGN PATENT DOCUMENTS

| JP | 2000156756 A | 6/2000 |
| JP | 2000209409 A | 7/2000 |

* cited by examiner

*Primary Examiner*—Cheukfan Lee
(74) *Attorney, Agent, or Firm*—Stolowitz Ford Cowger LLP (57) ABSTRACT

A document holding fixture for a vertical optical scanner. The fixture has a main body, a transparent panel, four linking bars, a document cover panel, and a document backing plate. The document holding fixture uses a simple four linking bar system to maintain a constant parallelism between the document cover panel and the surface of the transparent panel. Weight of the document cover panel provides necessary pressure to press a scan document firmly onto the glass surface of the transparent panel. To facilitate single hand document insertion, a stationing device is used to freeze the document cover panel when the panel reaches a horizontal position.

21 Claims, 6 Drawing Sheets

DOCUMENT HOLDING FIXTURE

CROSS-REFERENCE TO RELATED APPLICATIONS

This is a Continuation Patent Application of U.S. patent application Ser. No. 09/967,713, filed Sep. 27, 2001 now U.S. Pat. No. 7,280,257, which claims the benefit of foreign priority under 35 USC §119(a) to Taiwan, R.O.C Application Serial No. 90213862, filed Aug. 14, 2001.

BACKGROUND OF THE INVENTION

1. Field of Invention

The present invention relates to a document holding fixture. More particularly, the present invention relates to the document holding fixture for a vertical optical scanner.

2. Description of Related Art

Figure 1:
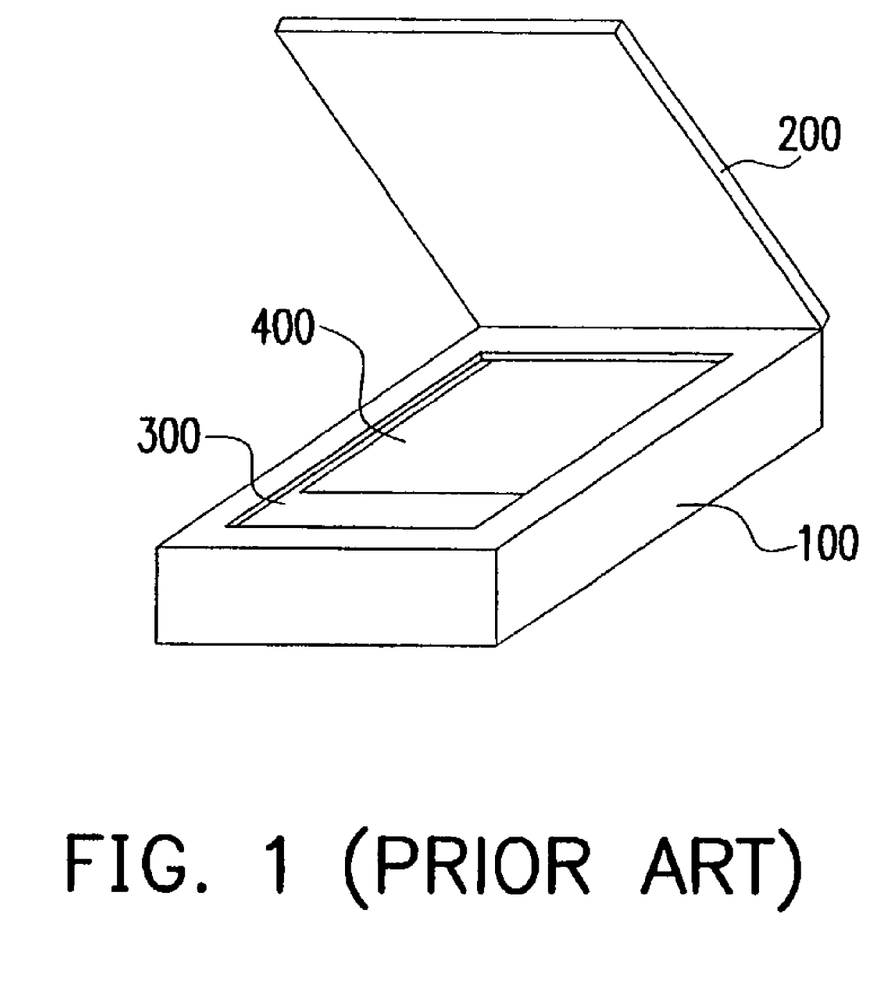
FIG. 1 is a perspective view of a conventional horizontal optical scanner.

A conventional optical scanner is shown in FIG. 1. The optical scanner has a main body 100 and an upper lid 200. To scan a document 400, the document 400 is placed flat on a horizontal transparent panel 300. The upper lid 200 is lowered onto the document 400 before the document is scanned. However, this type of scanner needs to occupy a relatively large desk area and thus reduces workspace. Furthermore, a horizontal optical scanner is limited by document size.

An effective means of reducing area occupancy and increasing workspace is to design a vertical type of optical scanner. However, one major problem for producing a vertical optical scanner is the provision of an effective document holding fixture.

SUMMARY OF THE INVENTION

Accordingly, one object of the present invention is to provide a document holding fixture that utilizes gravity and a simple four-link mechanism to grip and hold a document such that the document is attached firmly onto a transparent panel.

To achieve these and other advantages and in accordance with the purpose of the invention, as embodied and broadly described herein, the invention provides a document holding fixture for a vertical optical scanner. The vertical optical scanner at least includes a main body and a transparent panel for document placement. The main body has two open slots, one on each side of the transparent panel, so that the transparent panel is held in a vertical position relative to the ground. The document holding fixture includes four linking bars, a cover panel and a backing plate. The four linking bars are parallel to each other. Each linking bar has a first end and a second end. The first end of every pair of linking bars extends into an open slot on the main body and is respectively connected by hinges. The cover panel faces the transparent panel. The cover panel always remains parallel to the transparent panel as the cover panel is moved. The second end of every pair of linking bars is connected to the respective sides of the cover panel by hinges. The backing plate is mounted on the main body at the lower ledge of the transparent panel. The backing plate serves as a support and an alignment base for the document placed next to the transparent panel.

This invention also provides a vertical optical scanner. The vertical optical scanner has a transparent panel, a main body, a scanning module, a transmission device, an electric motor, four linking bars, a cover panel and a backing plate. The transparent panel is perpendicular to the ground and capable of scanning a document. The main body has an open slot on each side of the transparent panel. The scanning module is installed inside the main body. The transmission device inside the main body connects with and drives the scanning module during a scanning operation. The electric motor inside the main body connects with and drives the transmission device. The four linking bars are parallel to each other. Each linking bar has a first end and a second end. The first end of every pair of linking bars extends into an open slot on the main body and is respectively connected by hinges. The cover panel faces the transparent panel. The cover panel always remains parallel to the transparent panel as the cover panel is moved. The second end of every pair of linking bars is connected to the respective sides of the cover panel by hinges. The backing plate is mounted on the main body at the lower ledge of the transparent panel. The backing plate serves as a support and an alignment base for the document placed next to the transparent panel.

One major aspect of this invention is the reduction of floor space due to the deployment of a vertical optical scanner.

A second aspect of this invention is the selection of a simple four linkage parallel mechanism. This mechanism serves to maintain a constant parallelism between the document cover panel and the transparent panel. A scan document is pressed firmly onto the glass surface of the transparent panel by the weight of the document cover.

A third aspect of this invention is the provision of a backing plate to serve as a support and an alignment base for the scan document so that the document is prevented from dropping to the floor.

A fourth aspect of this invention is the provision of a stationing device for maintaining a constant horizontal position that facilitates single hand insertion of a scan document.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 2:
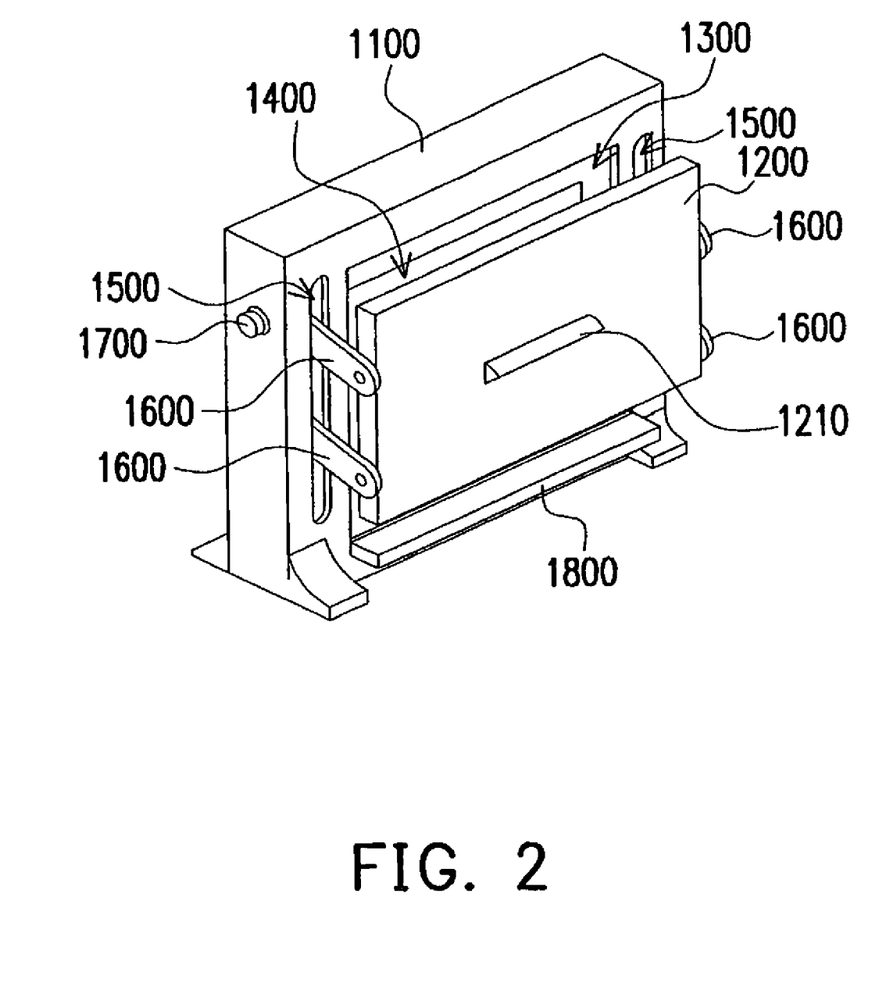
FIG. 2 is a perspective view of a vertical optical scanner according to this invention.
Figure 3:
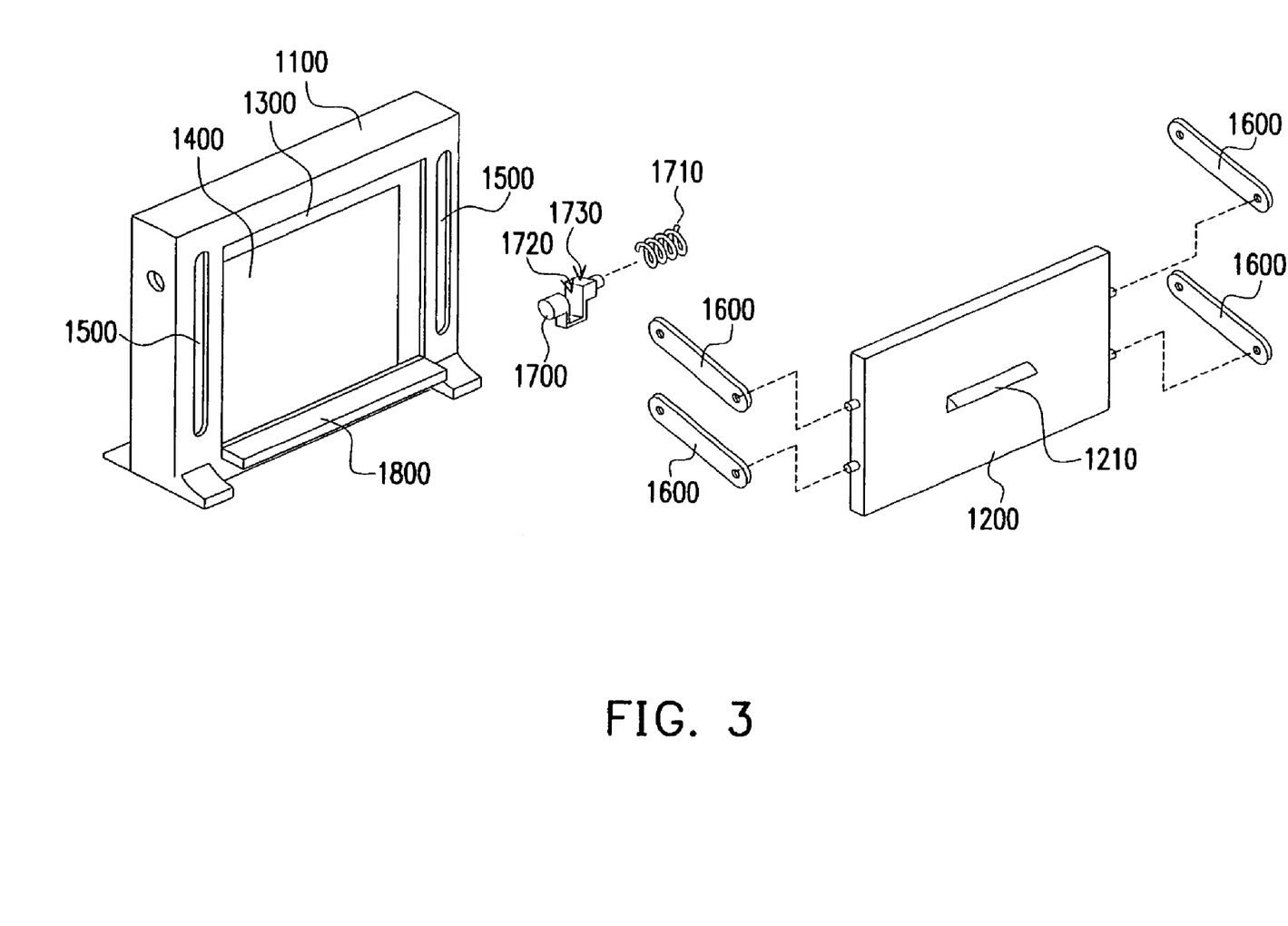
FIG. 3 is an exploded view of all the major components constituting the vertical optical scanner according to this invention.

FIG. 2 is a perspective view of a vertical optical scanner according to this invention. FIG. 3 is an exploded view of all the major components constituting the vertical optical scanner according to this invention. As shown in FIGS. 2 and 3, the vertical optical scanner has a main body 1100. A transparent panel 1300 is on one side of the main body 1100 perpendicular to the floor. The main body 1100 has a guiding slot 1500 on each side. A pair of linking bars 1600 passes through each guiding slot 1500 and fastens to the main body 1100. All four linking bars 1600 are parallel to each other. Each linking bar 1600 is free to move vertically through rotation relative to the point of attachment inside the main body 1100.

The other ends of the four linking bars are attached to the respective sides of a document cover panel 1200. Each linking bar 1600 is free to move vertically through rotation relative to the point of attachment at the document cover panel 1200. Since the four linking bars 1600 are mutually parallel, constant parallelism between the document cover panel 1200 and the transparent panel 1300 can be maintained. Through simultaneous vertical movement of all four linking bars 1600 about their respective pivotal attachment points at the main body 1100 and the document cover panel 1200, the panel 1200 is free to move towards or away from the transparent panel 1300. There is a handle 1210 on the exterior-facing surface of the document cover panel 1200 for lifting up the cover panel 1200.

Figure 4:
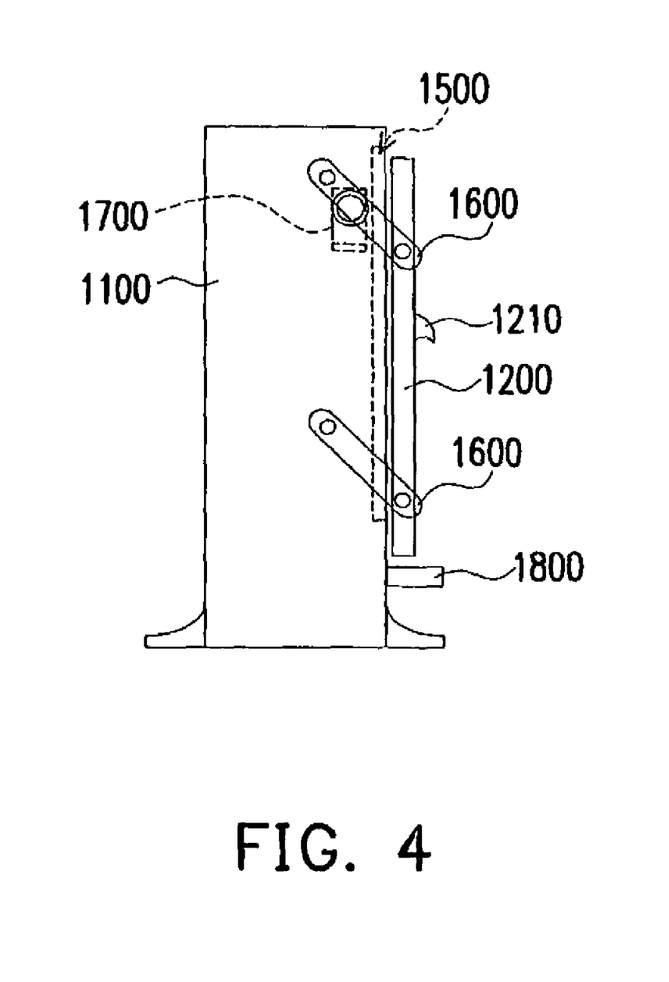
FIG. 4 is a side view showing a lowered document cover panel of the vertical optical scanner according to this invention.
Figure 5:
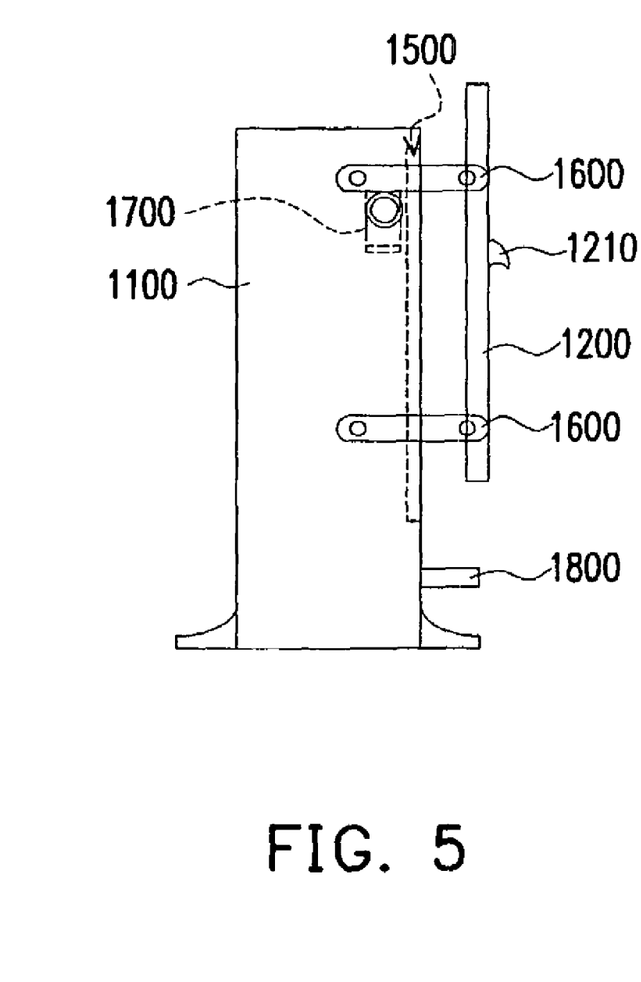
FIG. 5 is a side view showing a lifted document cover panel of the vertical optical scanner according to this invention.

FIG. 4 is a side view showing a lowered document cover panel of the vertical optical scanner according to this invention. Before conducting a scanning operation, the document, a force is applied to the handle 1210 to lift the document cover panel 1200. When the document cover panel 1200 is lifted up to such an extent that the four linking bars 160 are almost horizontal, a spring-loaded lock 1700 mounted on the main body 110 and located next to a pair of linking bars 1600 is employed to station the panel 1200. The spring-loaded lock 1700 has an internal spring 1710 (as shown in FIG. 3) that pushes the lock 1700 outward and latches the linking bars 1600 at a supporting surface 1730 (as shown in FIG. 3). Through this mechanism, the four linking bars 1600 are supported and the document cover panel 1200 is prevented from falling. FIG. 5 is a side view showing a lifted document cover panel of the vertical optical scanner according to this invention. At this point, no force needs to be applied to station the document cover panel 1200. A scan document 1400 may easily slip into the space between the transparent panel 1300 and the document cover panel 1200. Furthermore, there is a backing plate 1800 attached to the lower ledge of the main body 1200 for supporting the scan document 1400 and serving as an alignment base for the document 1400.

After proper positioning of the scan document 1400, the spring-loaded lock 1700 is depressed forcing the linking bars 1600 to dislocate from the supporting surface 1730 and fall into a groove 1720 (as shown in FIG. 3). Due to force of gravity, the document cover panel 1200 drops down bringing the cover panel 1200 back to the previous tight engagement position with the transparent panel 1300 (as shown in FIG. 4). Once the scan document 1400 is firmly pressed against the transparent panel 1300, scanning may begin. To initiate a scanning operation, an electric motor inside the main body 1100 drives a transmission device that carries a scanning module (not shown) to perform necessary scanning of the document 1400 on the transparent panel 1300.

The aforementioned holding device is not limited to the spring-loaded lock 1700. A cam system using a cam 1900 such as the one shown in FIGS. 6a and 6b may be used. Alternatively, a supporting groove 1510 sticking into the guiding slot opening such as the one in FIG. 7 or a spring-lever fastening lock 200 having a structure shown in FIG. 8 may be used instead. In fact, any methods or devices capable of stationing the document cover panel 1200 in a horizontal position can be employed.

Figure 6A:
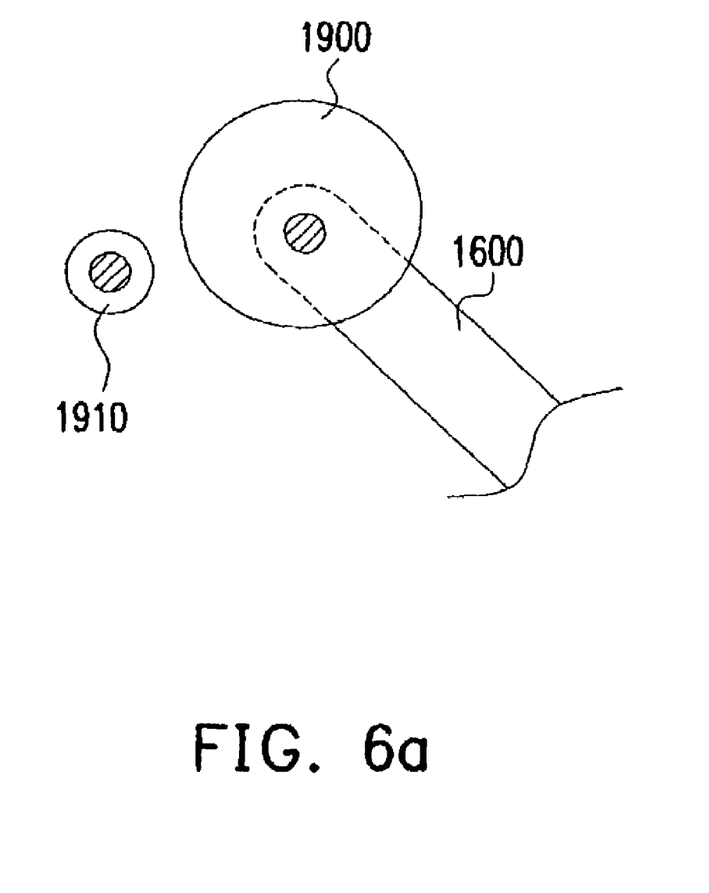
FIGS. 6a and 6b are sketches showing two cam positions for stationing the document cover panel according to this invention.
Figure 6B:
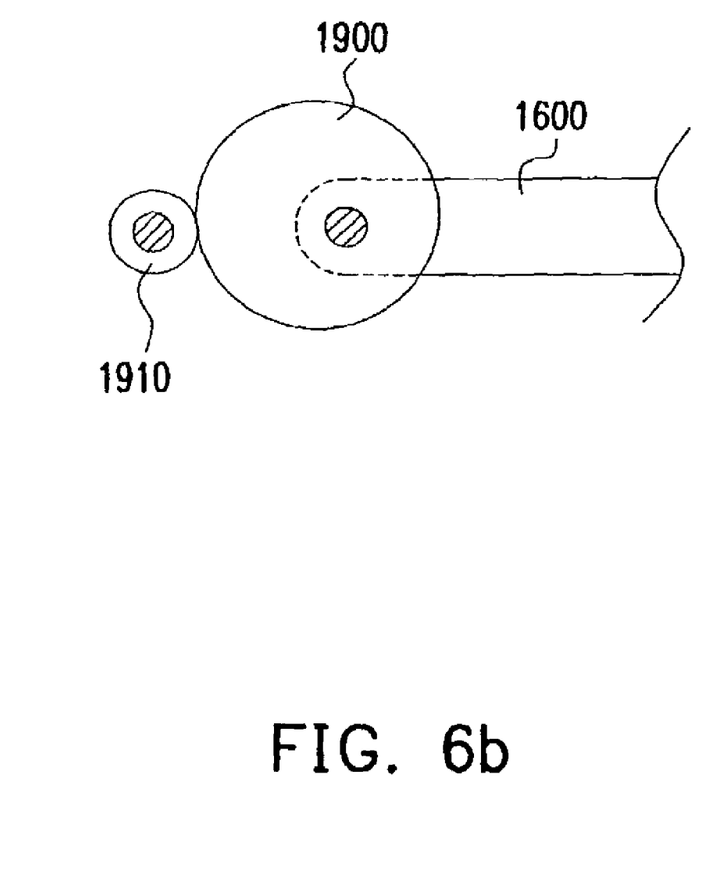
Figure 7:
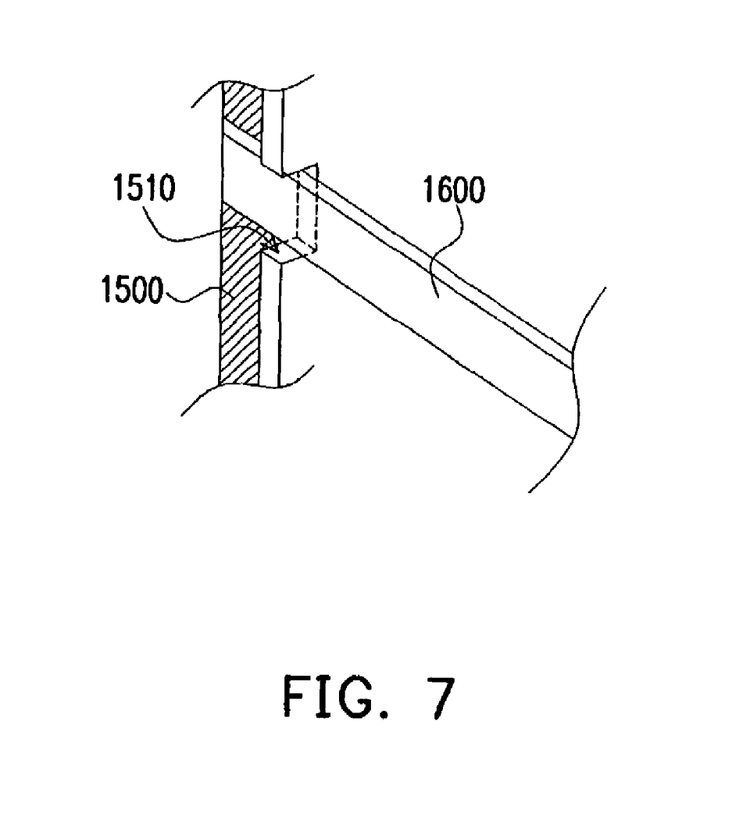
FIG. 7 is a sketch showing an additional stationing device beside the guiding slot opening of the document cover panel.
Figure 8:
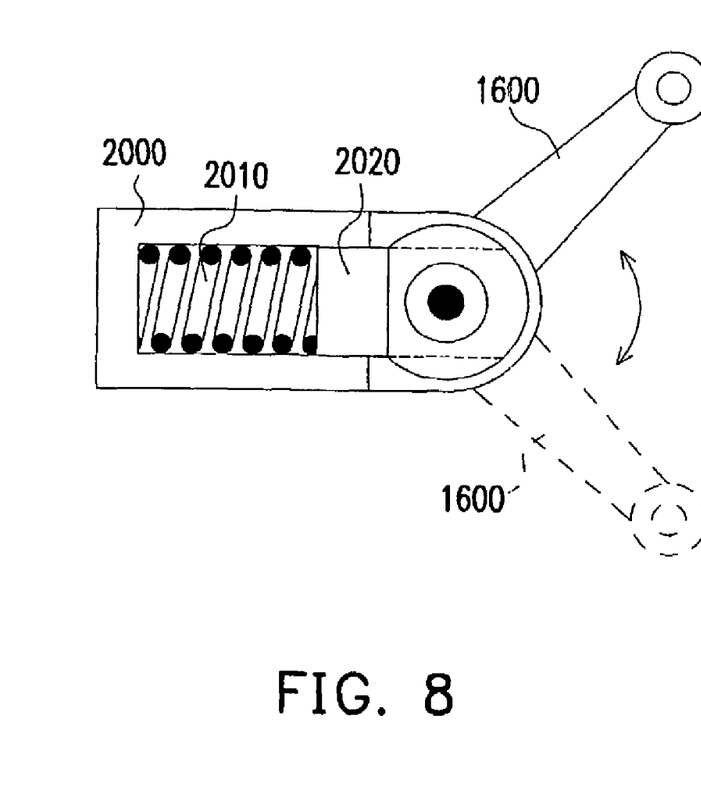
FIG. 8 is a side view showing a spring-loaded lever system for locking the document cover panel according to this invention.

FIGS. 6a and 6b are sketches showing two cam positions for stationing the document cover panel according to this invention. As shown in FIGS. 6a and 6b, a cam 1900 and a rubber roller 1910 system is mounted at the junction between at least one linking bar 1600 and the main body 1100. When the document cover panel 1200 is lifted from a position shown in FIG. 6a to a position shown in FIG. 6b, the cam 1900 and the roller 1910 are pressed together so that the document cover panel 1200 is held in a horizontal position. FIG. 7 is a sketch showing an additional stationing device beside the guiding slot opening of the document cover panel. As shown in FIG. 7, a supporting groove 1510 is added to the guiding slot opening 1500. When the document cover panel 1200 is lifted to a horizontal position, the linking bars 1600 are moved into the supporting grooves 1510 so that the document cover panel 1200 is held in the horizontal position. FIG. 8 is a side view showing a spring-loaded lever system for locking the document cover panel according to this invention. As shown in FIG. 8, a spring-loaded lever lock 2000 is attached to the junction between the main body 1100 and at least one of the linking bar 1600. The spring-loaded level lock has an internal spring 2010 and a round rod 2020. The spring 2010 pushes against the round rod 2020 so that the movement of the linking bar 1600 from the solid line position to the centerline position is stable. Hence, the document cover panel 1200 can remain in a horizontal position.

In conclusion, major advantages of this invention include:
1. Floor space is reduced because the optical scanner is erected vertically relative to the floor. Furthermore, volume of the optical scanner is not limited by size of the document.
2. A simple four linkage parallel mechanism is used. This mechanism maintains a constant parallelism between the document cover panel and the transparent panel. Weight of the document cover also presses a scan document firmly onto the glass surface of the transparent panel.
3. The handle on the backing plate permits easy lifting of the document cover panel.
4. A stationing device for holding the document cover panel in a horizontal position facilitates single hand insertion of a scan document.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A scanner, comprising:
   a body having at least two sides;
   two pairs of linking bars, wherein the linking bars of each pair are substantially parallel with respect to one another, said linking bars having a first end and a second end, and wherein the first ends of each respective pair of linking bars are coupled to a respective one of the sides of the body; and a cover panel having at least two sides, wherein the second ends of each respective pair of linking bars are coupled to a respective one of the sides of the cover panel.

2. The scanner of claim 1, further comprising a transparent panel disposed on the body.

3. The scanner of claim 1, wherein the two pairs of linking bars are configured such that the cover panel is substantially parallel with respect to a surface of the body and substantially perpendicular to the sides of the body.

4. The scanner of claim 1, further comprising:
at least one cam disposed on the body and coupled to at least one of the linking bars; and
at least one roller disposed on the body, wherein the at least one cam is configured to contact the at least one roller to fix the at least one of the linking bars in a substantially horizontal position when the at least one of the linking bars is moved into the substantially horizontal position.

5. A scanner, comprising:
a body comprising a document panel and one or more hinges formed on each side of the document panel;
a linkage mechanism comprising a plurality of parallel linking bars wherein a first end of the linkage mechanism is configured to attach to the one or more hinges of the body; and
a cover panel facing the document panel and attaching to a second end of the linkage mechanism.

6. The scanner of claim 5, further comprising a stationing device for holding the cover panel in a substantially vertical position.

7. The scanner of claim 6, wherein the stationing device comprises:
a spring-loaded lock configured to latch to the body in response to rotation of the parallel linking bars to enable locking the parallel linking bars in a substantially horizontal position.

8. The scanner of claim 6, wherein the stationing device further comprises:
a roller disposed near a junction between the body and the first end of a particular one of the linking bars; and
a cam disposed at the junction between the body and the first end of the particular linking bar, wherein the cam is configured to contact the roller to fix the particular linking bar in a substantially horizontal position in response to the particular linking bar being moved into the substantially horizontal position.

9. An apparatus, comprising:
means for supporting a document in a vertically-oriented position on an optical scanner; and
means for attaching a cover panel to the optical scanner to hold the document in the vertically-oriented position against a document panel of the optical scanner, wherein the cover panel is maintained substantially parallel with the document panel in both an open and closed position.

10. The apparatus of claim 9, wherein the means for supporting comprises a backing plate.

11. The apparatus of claim 10, wherein the backing plate is located beneath the document panel.

12. The apparatus of claim 9, further comprising:
means for changing the distance between the cover panel and the document panel while maintaining the substantially parallel relationship between the cover panel and the document panel regardless of the distance.

13. The apparatus of claim 9, further comprising:
means for releasably holding the cover panel in the open position.

14. The apparatus of claim 13, wherein the cover panel is attached to the optical scanner by a plurality of parallel linking bars, and wherein at least one of the plurality of parallel linking bars is held in a position substantially perpendicular to the cover panel.

15. The apparatus of claim 14, wherein the means for releasably holding the cover panel comprises:
a spring-loaded lock configured to latch to the optical scanner in response to a rotation of the at least one of the plurality of parallel linking bars to the substantially perpendicular position.

16. The apparatus of claim 14, wherein the means for releasably holding the cover panel comprises:
a roller disposed near a junction between the optical scanner and a first end of the at least one of the parallel linking bars; and
a cam disposed at the junction between the optical scanner and the first end of the at least one of the parallel linking bars, wherein the cam is configured to contact the roller to releasably fix the at least one of the parallel linking bars in a position substantially perpendicular to the cover panel in response to the at least one of the parallel linking bars being moved into the substantially perpendicular position.

17. A scanner, comprising:
a body having a surface located between at least two sides;
a plurality of linking bars, the linking bars having a first end and a second end, wherein the first end of each linking bar is coupled to an associated one of the sides of the body;
a cover panel having a face located between at least two sides, wherein the second end of each linking bar is coupled to an associated one of the sides of the cover panel; and
wherein the of linking bars is configured such that the face of the cover panel is maintained substantially parallel with respect to the surface of the body.

18. The scanner of claim 17, wherein the surface of the body comprises a scanner document platform surface.

19. The scanner of claim 17, wherein the face of the cover panel is substantially parallel to the surface of the body in both a closed and an open position, wherein the closed position occurs when the face of the cover panel is adjacent the surface of the body, and wherein the open position occurs when the face of the cover panel is located distally from the surface of the body.

20. The scanner of claim 17, further comprising:
a spring-loaded lock configured to latch to the body in response to rotation of the plurality of linking bars to enable the releasable locking of at least one of the plurality of linking bars in a position substantially perpendicular to the surface of the body.

21. The scanner of claim 17, further comprising:
a cam coupled to one of the plurality of linking bars; and
a roller coupled to the cam to fix the at least one of the plurality of linking bars in a position substantially perpendicular to the surface of the body in response to the plurality of linking bars being moved into the substantially perpendicular position.

* * * * *

UNITED STATES PATENT AND TRADEMARK OFFICE
CERTIFICATE OF CORRECTION

| | |
|---|---|
| PATENT NO. | : 7,460,281 B2 |
| APPLICATION NO. | : 11/498635 |
| DATED | : December 2, 2008 |
| INVENTOR(S) | : Hsiu-O Hsu |

It is certified that error appears in the above-identified patent and that said Letters Patent is hereby corrected as shown below:

At column 6, line 40, delete "the of" and insert -- the plurality of --, therefor.

Signed and Sealed this

Twenty-fifth Day of August, 2009

David J. Kappos
*Director of the United States Patent and Trademark Office*